(12) United States Patent
Gardner et al.

(10) Patent No.: US 7,832,649 B2
(45) Date of Patent: Nov. 16, 2010

(54) METHOD OF MAKING A PLURALITY OF PROTECTED DEVICES IN COMMUNICATION WITH A BACKGROUND DEVICE

(76) Inventors: Mark I Gardner, 5116 FM 535, Cedar Creek, TX (US) 78612; Dayton S. Whites, 123 Wamal Way, Cedar Creek, TX (US) 78612; Dayton E. Whites, 463 Dottie St., Lucedale, MS (US) 39452; James Elliott Walters, 463 Dottie St., Lucedale, MS (US) 39452

( * ) Notice: Subject to any disclaimer, the term of this patent is extended or adjusted under 35 U.S.C. 154(b) by 390 days.

(21) Appl. No.: 11/951,662

(22) Filed: Dec. 6, 2007

(65) Prior Publication Data

US 2009/0145970 A1    Jun. 11, 2009

(51) Int. Cl.
*G06K 19/06* (2006.01)

(52) U.S. Cl. .................................. 235/492; 235/380
(58) Field of Classification Search ................ 235/380, 235/382, 382.5, 487, 492
See application file for complete search history.

(56) References Cited

U.S. PATENT DOCUMENTS

2003/0043036 A1 *   3/2003   Merrem et al. ........... 340/568.1

* cited by examiner

*Primary Examiner*—Karl D. Frech
(74) *Attorney, Agent, or Firm*—Wilson Daniel Swayze, Jr.

(57) ABSTRACT

This invention includes a device to attach an identifying device to the item of interest. The identify device attached to the item of interest may be referred to as a protected device that can be kept in communication with a background device. A protected device is formed when a an item of interest such as a credit card, drivers license, or medical card has an identifying device attached to the item of interest that converts the item of interest to the protected device which protects an existing object of interest.

20 Claims, 3 Drawing Sheets

COMMUNICATION DEVICE-FREQUENCY A

MEMORY DEVICE

COMMUNICATION DEVICE FREQUENCY B

METHOD OF MAKING A PLURALITY OF PROTECTED DEVICES IN COMMUNICATION WITH A BACKGROUND DEVICE

FIELD OF THE INVENTION

The present invention relates to a communication device and more particularly to a protected device and background device.

BACKGROUND OF THE INVENTION

Since many personal items, workplace items, and national security items are of very critical value to individuals, governments, law enforcement, national security, and corporations, the ability to be aware at the earliest possible time that a valuable item/item of interest is taken without the owner's knowledge and/or consent is of great interest to society and the owner of the valuable item. The item of interest may be a car, credit card, wallet, keys, or any physical object. The loss of a credit card, driver's license or other valuable item can be a major concern for individuals.

U.S. Pat. No. 7,128,274 discloses a near field communication device included in a secure transaction card provides an addition and/or transitional communication link for communicating secure transaction information. The near field communication device may be selectively engaged or disengaged and, when engaged, either active or passive modes of operation of the near field communication device can be selected. in the active mode, secure transaction information is transmitted upon establishment of a communication link with a complementary near field communication device. In the passive mode, secure transaction information is transmitted upon interrogation from a complementary near field communication device. Secure transaction information is generated and stored for transmission in a memory and at least a portion of the memory is erased or nulled upon transmission or upon expiration of a selected period of time.

U.S. Pat. No. 4,916,434 discloses a credit card carrier having a plurality of individual card holder pockets formed of celluloid or similar thin plastic material. Each of the pockets is mounted on a flap of the wallet and is adapted to receive a credit card. Each of the pockets is placed one upon another in overlapping relationship and each pocket is provided with an opening for receiving a switch. A switch is formed from a pair of Mylar strips, one of which is the mirror image of the other. The Mylar strips face each other and each facing surface is provided with a thin layer of electrically conducting metallic foil. The switch includes a plurality of arms projecting upwardly and outwardly from the central portion of the strip and all of the arms are electrically connected one to the other. Each of the arms projects into the opening so that each pocket receives one pair of switch arms. The arms are biased toward each other by a spring clip member which engages a portion of each of the arms. A credit card when inserted into a pocket between a pair of arms breaks contact between the arms. A proximity switch is also included in the circuitry which must be closed for an alarm to sound in the event a card is missing from a pocket.

These patents are incorporated by reference in their entirety.

SUMMARY

A communication device for a user includes a background device for communication and for providing an alert, and a protected device for communication with the background device.

The background device alerts the user when the distance between the protected device and the background device exceeds a predetermined distance.

The protected device may be a protected card, and the protected card may include a first communication device.

The protected card may include a second communication device, and the protected card may include a memory device.

The protected card may include a picture screen, and the protected card may include a digital bar code.

The digital bar code may be adapted to represent purchased tickets, and The protected card may be adapted to be attached to a computer.

The protected card may be adapted to be attached to a cell phone, and the protected card may be adapted to access the Internet.

The protected card may be adapted to access financial institutions, and the protected card may be adapted to hold personal information.

The personal information may include fingerprint information, and the personal information may include DNA information.

The protected card is adapted to be used for automated billing, and the protected card may be adapted to be attached to the exterior of an item of interest.

The protected card may be adapted to be inserted into a user.

BRIEF DESCRIPTION OF THE DRAWINGS

The invention may be understood by reference to the following description taken in conjunction with the accompanying drawings, in which, like reference numerals identify like elements, and in which.

DETAILED DESCRIPTION

Figure 1:
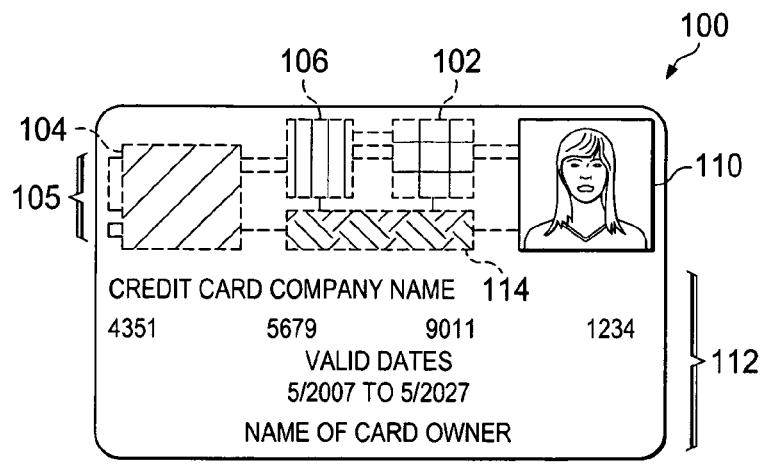
FIG. 1 illustrates the front of the protected card of the present invention.

A method and apparatus is provided for forming a new compact device (called the protected card) that may be in continuous communication with a background device with a wide range of frequency selection using EM (Electromagnetic Radiation). The device provides protection from theft and misplacement of any object the protected card is attached to or located within. If the protected card is displaced by a predetermined distance, the background device is activated so the owner is aware that his asset has been displaced from its intended location. The protected card may include security information and other features that enable the user to reduce the need for multiple cards, passwords, and any information the user decides to be in contact with. The protected card may be used as a driver license or passport or a combination driver license and passport.

The identifying device may be attached to an item of interest such as Credit Card, Driver's License, Medical Card, Gift Card, or any Card Configuration for the Protected Device. Consequently, when the item of interest is a card such as described above, the protected device is referred to as a protected card.

The concept is that the protected device may be coupled to a background device by either wires or wirelessly such that when the protected device and the back ground device may be separated at a predetermined distance, a message/alarm signal is sent or the message/alarm signal is no longer received from the protected device to the background device so that the owner of the protected device has an indication that the predetermined distance between the protected device and the background device has been exceeded. The protected device/card may also contain additional security features to more accurately identify the person or object that has possession of the protected card and any other information that the owner desires.

The background device may be located on a person, placed in a vehicle such as a car, truck or motorcycle, in a dwelling such as a home, garage or office, or any location that is convenient to keep track of the protected device. The flexibility of the location of the background device is useful to the user so that the user will continually know that the protected device has not been transported without his knowledge/consent. Since most individuals own a credit card, driver's license, and many other critical cards in a card configuration, these may be subject to the teachings of the protected cards of the present invention. The identifying device may be externally attached or internally attached to the item of interest. The shape of the protected card may change as an option also.

External attachments may be added to any existing card or object for immediate monitoring.

In the previous example, the protected device was integrated into the card. The shape of the identifying device should correspond to the shape of the item of interest. The shape of the present invention can take on any shape that is convenient for the user. Some further illustrative examples are given below. The shape may also be in the form of an existing object, or the shape may be configured to enable attachment to an existing object. Some examples of the item of interest may include a pen, car keys, and book, and the identifying device may have the shape which can be used conveniently with the above items of interest.

One concept of the present invention may be that the protected device at the background device may be physically separated but in wired or wireless communication. The background device should detect when a distance between the background device and the protected device exceeds a predetermined limit. This predetermined limit may be measured by signal strength between the background device or the protected device or may be measured by a measurement from a GPS device. In one aspect, the identifying device could be universally attached to any item of interest in order that the background device could be used with any item of interest. The present invention may include the pairing of one or more devices that may be kept in communication such that one of the devices is referred to as the background device (this background device may be in a separate location from the protected device or devices for most applications), would be able to detect if the protected device was separated from the background device at some predetermined distance and alert the background device which alerts the user.

Figure 2:
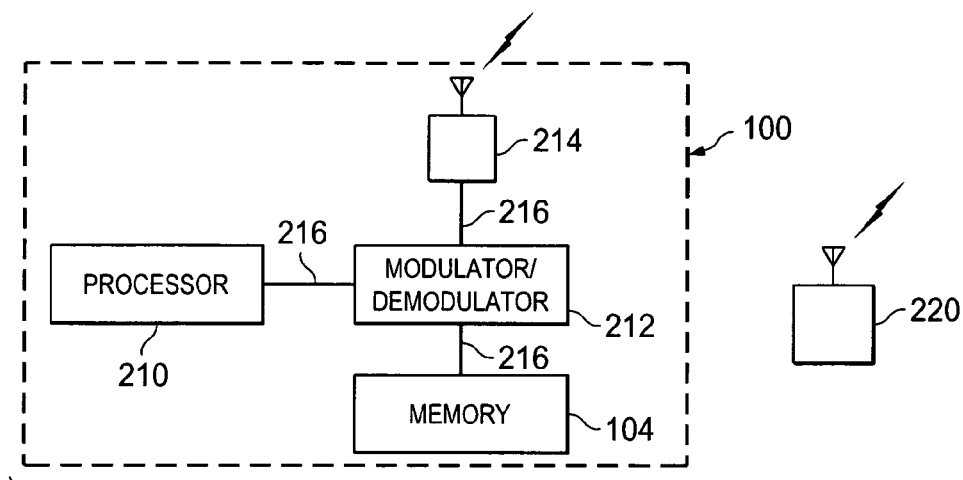
FIG. 2 illustrates a system diagram including the protected card and the background card of the present invention.

The protected card 100 may include the following features as illustrated in FIG. 1. Each of the protected cards 100 may include a first communication device 102 attached to the card (either internally or externally attached) for communication with the background device 220. FIG. 2 illustrates a system of the present invention which may include a protected card 100 and a background card 220. The first communication device 102 which may operate at a first frequency and may include a processor 210 a modulator/demodulator 212, an antenna 214 and a channel 216 for communication such as shown in FIG. 2. The first communication device 102 is coupled to the memory device 104 by the channel 216. The protected card 100 may include a second communication device 106 which may operate at a second frequency and which is connected by a channel 216. The memory device 104 and communication device 102 may function either separately or as a combined device, and are located on the protected card 100. Alternatively, the protected card 100 may include only a memory device 104 or only a communication device 102. Additionally, the protected card 100 as shown including a picture screen 110 which includes a picture of the user which has been retrieved from memory 104, a digital bar code 114 and indicia 112.

Figure 3:
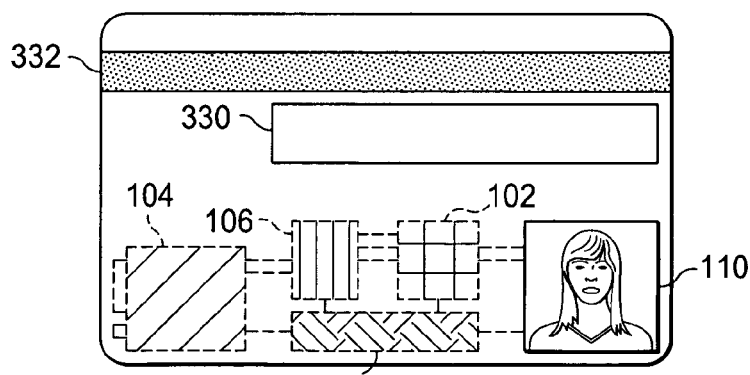
FIG. 3 illustrates the back of the protected card of the present invention.

FIG. 3 illustrates an alternate protected card 100 with the first communication device 102, the second communication device 106, the memory device 104 and the digital bar code 114 on the back of the protected card 100. FIG. 3 illustrates a magnetic strip 332 and rectangular area 330 for a signature.

Figure 4:
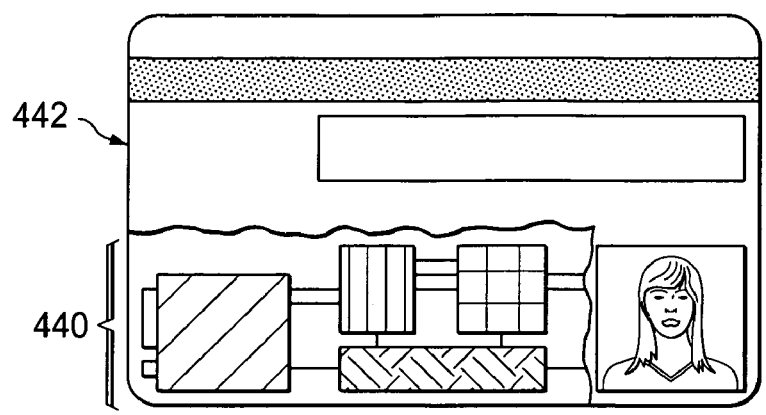
FIG. 4 illustrates a circuit diagram of the protected card of the present invention.
Figure 5:
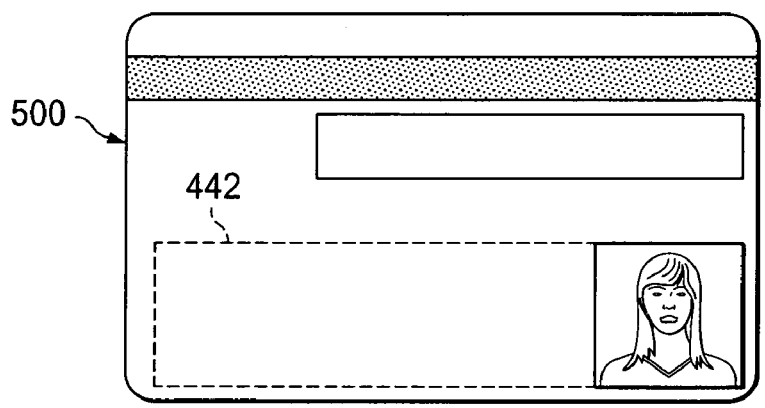
FIG. 5 illustrates an another circuit diagram of the protected card of the present invention.

FIG. 4 illustrates the identifying device 440 external to the item of interest 442 which is shown as a protected card 100. FIG. 5 illustrates the protected card 100 with the identifying device 440 internal to the protected card 500.

Figure 6:
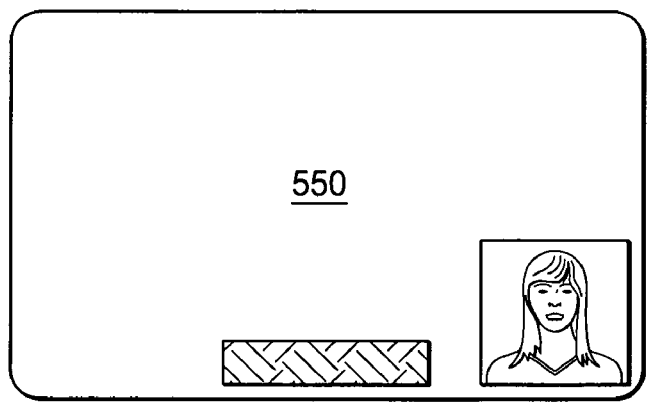
FIG. 6 illustrates another view of the back of the protected card of the present invention.

FIG. 6 illustrates the identifying device 550 as a card which can be attached to the exterior of another object such as a car. The identifying device 550 may be external or internal to the card.

The features of the protected card 100 may not be physically attached to the background device.

The communication device 102 allows the protected card 100 to communicate with the background device 220. The antenna 214 may broadcast an EM signal (Electromagnetic signal). In one embodiment, the frequencies of the EM signal that may be used are in the range from 10.0 MHz to 3.0 GHz. However, the communication from the protected card 100 is not restricted to any frequency range and may span the entire EM spectrum. The range of the protected card 100 may depend on the frequency selected and the application for the communication device. The communication device is located on or within the protected card 100.

The memory device 104 may allow storage of information on the protected card 100. Memory size of the memory device 104 may be typically 10K bytes to 200 GB (giga byte), depending on the application. The potential information to be stored within the memory device 104 may include a picture of the individual, password, fingerprints, DNA information, eyes scans, or any detailed information that can be used to confirm the owner of the protected device, or general data that is known to the individual.

A connection 105 for the memory device 104 may be provided to interface with an external device. The external device may be connected by either a physical or wireless connection. The connection 105 of the memory device 104 to the external device enables the user to access and store critical information on the protected card 100 as mentioned above. Also the external device may include a cell phone, computer, or any convenient device. This feature enables driver's licenses, credit cards, and medical information to be updated online for renewal and allows for future security feature updates of the protected device. The connection 105 with the external device may also be for charging of the card and software updates. The protected card 100 may be implanted into any living or non-living material object permanently attached, such that when removed, would cause an alarm. A further example may display a protected card 100 permanently attached to a car, and all car maintenance may be updated on the car's protected card memory as well as ownership and other details. The protected card 100 could also be implanted into a human or attached externally to a person such that important medical information could be available during surgery for each specific patient. Prescriptions and medical history may also be downloaded to the protected card 100 into the memory device 104.

A small screen 110 to show a picture may be located on the protected card 100 as an option.

The protected card 100 may be located in a person's wallet, attached to a belt, located in the shoes, attached to glasses, any body part, or on any article of clothing.

The range of the protected card 100 may vary depending on the needs of the user. In one embodiment, the protected device 100 may have a range that can be detected to a short distance of 30 ft. In another embodiment, the range of the protected card 100 may be detected up to 10 ft. In yet another embodiment, the protected card 100 can have range of 100 ft to several miles. In the yet another embodiment, the range of the protected card 100 may be over most of the US and over several continents of technologically developed nations. The range and accuracy of detection is determined by the frequency and functionality of the communication device 102 and memory device 104. The communication device 102 may operate at preferred frequency and be capable of operating at additional 100 frequencies that in close proximity to the preferred frequency. The frequencies may be input to the memory device 104 and stored for use of the communication device 102. This operation is similar to the operation of a car radio that has the FM stations available to the user to select from. Multiple frequency applications are available on one protected card to cover applications for most individuals for costly items that need protection.

The protected card 100 may include a digital bar code 114. The digital bar code 114 may be used to download gift cards from the Internet and be stored on the memory device. Also, physical tickets for movies, sports events, or any event that requires waiting in line can be eliminated by displaying the digital bar code 114 that has been program to represent the advance purchase to the event. The digital bar code 114 could also be printed out as a ticket or serve as a receipt for any purchased item as an option or displayed on the protected card. The protected card 100 may store hundreds of digital bar codes 110 may co-exist on the same protected device in memory. Further applications of the bar code could be used to identify a person for financial transactions.

The invention is not limited to the above illustrative examples.

The protected card 100 may be physically attached to the background device 220. This application may include the protected card 100 to be directly attached to a computer or cell phone as an example when these devices are used as the background device 220. This arrangement may enable the protected card 100 to access the Internet, banks, or stores for financial transactions. Other applications within the scope of the invention may be to obtain an update of a driver's license, debit card, medical card or gift card. Additionally, a cell phone or computer may send information to and from the protected card 100 that is contained in the memory location of the memory device 104 on the protected card 100. A charging of the battery of the protected device 100 is possible when the protected device 100 is physically attached to a home device in certain situations.

The background device 220 may monitor the location of one or more protected cards 100. When the protected card 100 is removed from its location by a predetermined distance a message signal is sent back to the background device 220. The message may be in form of a call on a cell phone, email, audio sound, flashing light. A large number of protected devices 100 may be connected to the background device 220, and these protected devices 100 may be continuously monitored by one background device 220.

Examples of the background device 220 may include a computer or a cell phone. The background device 220 may be located in a car or may be located in a security location for business or government. The background device 220 may be located in house, or the background device 220 may be located on a person.

The protected card 100 has applications in law enforcement and national security.

Since the protected card 100 has the memory device 104 and location features, many applications for the protected card 100 exist for law enforcement.

One application of the protected card 100 is in airport identification and access to high security areas. Since, a license or passport of the protected card 100 may contain information about DNA, fingerprints, eye information, an airport personnel could confirm whether a person with a particular ID was actually the individual in question with quick fingerprint or DNA sample to see if this matched with protected card ID, prior to granting boarding pass or access to a high security area.

A passport or driver's license may contain details about an individual such as fingerprints, DNA, and other security items.

The protected card 100 could be used for automatic billing for toll roads and sports events. The protected card 100 may include detailed information about a persons ID, and the digital bar code 114 may provide for automatic billing for any situation that requires a ticket to be purchased, or money to be paid in a secure fashion. This would greatly reduce time spent in lines and waiting in traffic.

The protected card 100 may help in the location of missing persons or children. A child who is kidnapped or lost can also be located in this fashion if the child has a protected device 100 on his person.

The protected card 100 may be used for tickets, gift cards, credit cards, licenses, and ID information downloads to the protected card 100. License renewal may be done online by a download to a protected card 100, car license, student ID, work ID, any picture ID also license renewals for cars, tickets can be done by the download to the protected card 100.

The protected device 100 could include car/personal identification. The protected device 100 may include the family car information to identify the people that are typically in car. Then as car travels, the people may be identified as in that car as the car passes through read points that may be randomly located. The read points could read and detect the presence of any person located in car and then make the information available to the public for law enforcement. The car itself may be also have an ID located on a protected card 100 which has been built in to car to locate stolen or misplaced cars.

The protected card 100 may aid in establishing criminal locations. Citizens that are convicted of certain crimes may have a government based protected card such that they can be located at all times for the monitoring of the activity of the criminals. The criminal record may also be attached to the card that would detail the specific restrictions for each individual.

A protected device 100 may be added to an existing card. Most existing cards are in the dimensions of approximately 5.5 cm×8.6 cm. The invention enables both a memory device 104, communication device 102, and all support elements to be placed on the existing card to make an existing driver's license or credit card a protected card.

In one embodiment a protected device will be added to an existing card. In another embodiment a new protected device will be made that will replace the current shape of all cards that are used today as an one illustrative example.

The front of the protected card 100 may be modified. The power/battery needs of the protected card 100 may be located in the memory device 104 and may also be located in either communication device 102 at an alternative location.

The digital bar code 114 may be changed depending on the characteristic or selection of the protected card 100 as gift card, driver's license, credit card etc from secure feature in the memory device 104.

Figure 7:
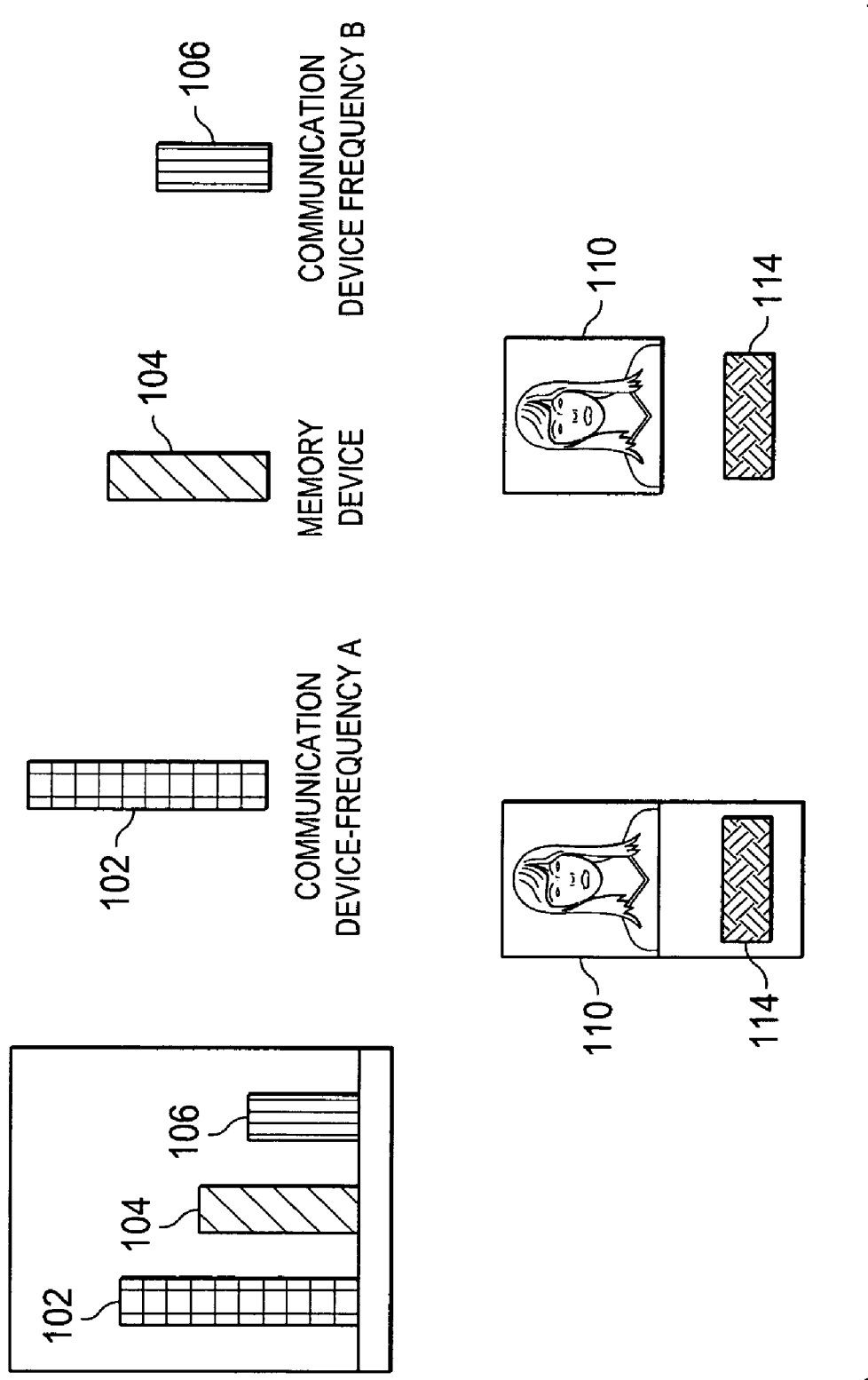
FIG. 7 illustrates alternatives for the memory device and the first and second communication devices.

The minimum feature size of the protected card may correspond to the scaling of the microelectronic circuit elements, the memory size, and the desired features. The width of a typical device may be less than approximately 0.25 inches (or 0.64 cm). In the previous example, a card configuration was shown which included circuit components that can easily fit on a card with dimensions 5.5 cm×8.6 cm. It is possible to have the shape of the protected card 100 altered to accommodate a more compact design of the protected card 100. For example, a wrist watch shape, or any shape is within the scope of the present invention. This flexibility enables the communication device 102 and the memory device 104 to be stacked as shown in FIG. 7 for savings in packing density. It should be noted other shapes are available for the protected card 100, and the circuit elements can be shaped in order to accommodate the shape of the protected card 100.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A communication device for a user, comprising:
   a background device for communication and for providing an alert;
   a protected device for communication with the background device;
   a GPS device to measure the distance between the background device and the protected device;
   wherein the background device alerts the user when the distance between the protected device and the background device exceeds a predetermined distance.

2. A communication device for a user as in claim 1, wherein the protected device is a protected card.

3. A communication device for a user as in claim 2, wherein the protected card includes a first communication device.

4. A communication device for a user as in claim 3, wherein the protected card includes a second communication device.

5. A communication device for a user as in claim 3, wherein the protected card includes a memory device.

6. A communication device for a user as in claim 3, wherein the protected card includes a picture screen.

7. A communication device for a user as in claim 3, wherein the protected card includes a digital bar code.

8. A communication device for a user as in claim 7, wherein the digital bar code is adapted to represent purchased tickets.

9. A communication device for a user as in claim 2, wherein the protected card is adapted to be attached to a computer.

10. A communication device for a user as in claim 2, wherein the protected card is adapted to be attached to a cell phone.

11. A communication device for a user as in claim 2, wherein the protected card is adapted to access the Internet.

12. A communication device for a user as in claim 2, wherein the protected card is adapted to access financial institutions.

13. A communication device for a user as in claim 2, wherein the protected card is adapted to hold personal information.

14. A communication device for a user as in claim 13, wherein the personal information includes fingerprint information.

15. A communication device for a user as in claim 13, wherein the personal information includes DNA information.

16. A communication device for a user as in claim 2, wherein the protected card is adapted to be used for automated billing.

17. A communication device for a user as in claim 2, wherein the protected card is adapted to be attached to the exterior of an item of interest.

18. A communication device for a user as in claim 2, wherein the protected card is adapted to be inserted into a user.

19. A communication device for a user as in claim 2, wherein the protected card is adapted to be used as a driver license.

20. A communication device for a user as in claim 2, wherein the protected card is adapted to be used as a combined driver license and passport.

* * * * *